United States Patent Office 3,052,656
Patented Sept. 4, 1962

3,052,656
PROCESS FOR THE PRODUCTION OF POLYMERS CONTAINING DISULPHONIMIDE GROUPINGS
Heinz Groene and Carlhans Süling, Leverkusen, Germany, assignors to Farbenfabriken Bayer Aktiengesellschaft, Leverkusen, Germany, a corporation of Germany
No Drawing. Filed Feb. 16, 1960, Ser. No. 8,925
Claims priority, application Germany, Feb. 18, 1959
12 Claims. (Cl. 260—78.5)

The present invention relates to novel chemical compounds, more particularly to compounds containing disulphonimide groupings and to a process for their production. More especially the invention is concerned with the polymerization of polymerizable disulphonimides with other vinyl compounds.

It is known to prepare polymers having acid properties by the polymerization of unsaturated compounds containing carboxyl or sulpho groups. Another method of obtaining such products is by the subsequent introduction of acid groups into the polymers, for example polystyrene sulphonic acid can be produced by the sulphonation of polystyrene. Polymerization products of acid character are of great technical interest and are widely used. For example, polymers containing a small proportion of acid groups can be processed to give shaped articles, filaments, foils, films, fibres, etc. having a high dyeing capacity. Polymers having a high content of acid groups may, for example, be used as ion exchangers, soil-improving agents, wetting agents and dispersing agents.

It is an object of the present invention to provide novel polymers, more particularly polymers containing a plurality of disulphonimide groupings. Another object of the present invention is to provide a process for the production of these disulphonimide groupings containing polymers and especially a process which can easily be carried out and leads to considerable high yields. A further object is to provide acrylonitrile polymers which contain disulphonimide groupings. A still further object is to provide acrylonitrile polymers of this type which can easily be formed into shaped articles such as filaments and foils which itself show a high dyeing capacity, high thermostability and a very light initial tone. Still further objects will become apparent hereinafter.

It has been found that polymers having acid properties can be prepared in a simple manner and in high yields by the polymerization of olefinically unsaturated disulphonimides containing at least one polymerizable double bond either alone or in conjunction with one or more other compounds which contain at least one olefinically unsaturated polymerizable double bond.

By olefinically unsaturated polymerizable disulphonimides are meant compounds which contain at least one disulphonimide group and also at least one olefinic double bond in the molecule and in which the reactivity of the double bond is so pronounced that polymerization can be carried out with the aid of the conventional activators or activator systems.

Preferred olefinically unsaturated polymerizable disulphonimides for employment in the process according to the present invention are vinyl phenyl disulphonimide, vinyl methyl disulphonimide and also disulphonimides of the general formula:

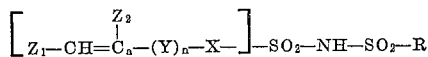

in which

R represents an alkyl radical, a substituted or unsubstituted aryl radical, or is identical with the expression in the square brackets, X represents a substituted or unsubstituted arylene or alkylene bridge.

Y represents one of the following bridge members:

(a)

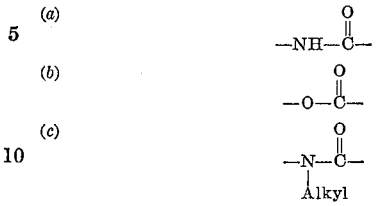

(b)

(c)

and (d)

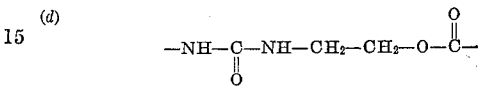

the terminal carbonyl-carbon atom always being linked to the carbon atom $C_a$ in the above formula, $Z_1$ represents a hydrogen atom, an alkyl radical or a carboxyl radical, $Z_2$ represents a hydrogen atom or an alkyl radical, and $n$ is 0 or 1.

The following compounds of the aforementioned general formula are particularly suitable for employment in the process according to the present invention: vinyl benzene-benzene-disulphonimide, vinylbenzene-methyl-disulphonimide and their derivatives which are substituted in the aromatic nucleus by organic radicals, such as alkyl, aryl, hydroxyalkyl, hydroxyaryl, halogen and other groups. The said disulphonimides may be prepared by reacting styrene sulphonamide with benzene and/or methane sulphonic acid chloride in an alkaline medium in known manner. This reaction can be effected by the procedure disclosed in German Patent 757,262. In Example 4 (below) there is illustrated a specific instance of a preparation of unsaturated disulphonimides according to this method. The substituents of the reactants will depend on the particular substituted disulphonimide to be produced.

Also suitable for employment in the process according to the present invention are the reaction products of unsaturated acid halides or acid anhydrides, such as acrylic, methacrylic or crotonic acid chlorides and maleic anhydride with disulphonimides which contain groups capable of acylation, such as primary or secondary amino groups or hydroxyl groups. These disulphonimides may also be obtained by known processes. In Example 2 of United States Patent 2,374,934 there is described the preparation of disulphonimides by this method and specifically the reaction of the unsaturated acid chloride with a disulphonamide. The reaction of acid halides with amines is additionally described by Houben Weyl, Methoden der Organischen Chemie, vol. 11/12, pp. 10–14 (1958). Specific instances of the preparation of unsaturated disulphonimides according to the aforesaid reaction have been included in Examples 1 and 7 which follow.

Also suitable are the reaction products of unsaturated isocyanates, such as [β-isocyanatoethyl]-methacrylate with hydroxy- or aminodisulphonimides. These products are also obtainable by processes known per se. The method of preparation of the unsaturated disulphonimides by reacting unsaturated isocyanates with disulphonamides containing a hydroxy or amino group is the conventional reaction of amino compounds and isocyanates. The aforesaid reaction is described in Houben Weyl, vol. 8, pp. 157–159 (1952).

As co-polymerization components there may be employed in the process according to the present invention compounds which contain a vinyl group, such as acrylonitrile or methacrylonitrile, acrylic or methacrylic esters, acrylic or methacrylic acids, acrylic or methacrylic amides, styrene, divinyl benzene, vinyl chloride, vinyl esters, vinylsulphonic acid and their derivatives; also butadiene, isoprene and chloroprene. There may also be employed as co-polymerization components unsaturated compounds which contain an activated —C=C—bond, such as that which is present for example in crotonic acid, derivatives thereof, in 1,1-dichloroethane and maleic acid, fumaric acid and derivatives thereof.

The co-polymers according to the invention may contain more than one of each of the aforementioned unsaturated disulphonimides and vinyl compounds. Examples of such co-polymers are co-polymers of acrylonitrile, acrylic acid methyl ester and vinyl benzene-benzene-disulphonimide, co-polymers of acrylonitrile, methacrylamino-benzene-benzene disulphonimide and vinyl benzene-methyl disulphonimide or co-polymers of butadiene, acrylonitrile and reaction products of [β-isocyanato-ethyl]-methacrylate with aminobenzene-benzene disulphonimides.

In a preferred embodiment of the invention there are polymerized (1) 0.1 to 5 parts by weight of a disulphonimide according to the invention, (2) 2.5 to 10 parts by weight of acrylic acid ester such as acrylic acid methyl ester, methacrylic acid ester such as methacrylic acid methyl ester, vinylacetate or vinyl chloride with (3) 97.4 to 85.0 parts by weight of acrylonitrile. In a further preferred embodiment there are polymerized 99.9 to 95.0 parts by weight of acrylonitrile with 0.1 to 5 parts by weight of a disulphonimide according to the present invention.

The polymerization of unsaturated disulphonimides or the co-polymerization of unsaturated disulphonimides with at least one vinyl compound can be carried out in any conventional method thus for example in block, solution, dispersion or emulsion. The method of the polymerization is not critical to the process of the invention. For emulsion polymerization, it is possible to use the known emulsifiers, such as salts of fatty acids and also alkyl or aryl sulphonates, ammonium salts with emulsifying properties such as [β-diethylaminoethyl]-stearate hydrochloride, and also non-ionic emulsifiers, for example polyalkylene oxides. Suitable as activators are those compounds which are able to form radicals, for example peroxidic compounds such as hydrogen peroxide, persulphates, alkyl or aryl peroxides, acyl peroxides and hydroperoxides. Azo compounds such as azodiisobutyronitrile can also be used. It is particularly advantageous to carry out the polymerization in an aqueous medium at a pH value below 7, in which case there may be employed combinations of persulphates and sulphur compounds of low valency state, as well as other Redox systems, if desired in the presence of small quantities of heavy metals.

The aforementioned unsaturated disulphonimides may be employed as such or in the form of their salts, it being preferred to use salts having good solubility, such as the alkali metal, ammonium and alkaline earth metal salts.

Homopolymers of unsaturated disulphonimides or co-polymers with a high disulphonimide content are either soluble in water or have a strongly hydrophilic character. Such products are, for example, suitable for use as soil-improving agents, wetting agents and dispersing agents.

Co-polymers with a relatively low disulphonimide content are employed in the production of shaped articles, foils, films, filaments and fibres. Co-polymers of acrylonitrile and small amounts of unsaturated disulphonimides are of particular interest. Co-polymers of this type, which may also contain a third component such as acrylic ester, can be processed by known methods to form filaments and fibres which show an excellent dyeing capacity with basic dyestuffs. Such products can consequently be dyed in very deep tones. A special advantage is that in contrast to the more strongly acid sulpho group, the disulphonimide grouping shows no influence on the colour tone of the dyed fibres and fabrics. Furthermore, such fibres have a very light initial tone, which renders an additional bleaching unnecessary for many purposes of use in the textile field.

An additional surprising advantage of the acrylonitrile/disulphonimide co-polymers prepared according to the invention is their high thermostability. Even at temperatures of 160° C., there is no essential change in colour of the co-polymers. Furthermore, the polymers show a good stability with respect to yellowing influences, such as the action of alkalis and oxygen. The hydrophilic character of acrylonitrile polymers is improved by the content of disulphonimides, and this results in an increased adsorption of moisture. The resulting reduction of the static charging of filaments and fabrics made from such polymers is of particular advantage in the processing and use thereof in the textile field.

The present invention is further disclosed in the following examples, which are illustrative but not limitative thereof:

Example 1

280.0 parts by volume of water, 18.0 parts by weight of acrylonitrile and 2.0 parts by weight of methacroylaminobenzene-benzene disulphonimide are placed in a vessel from which the air has been displaced by nitrogen. The clear solution is adjusted to a pH value of 3 with sulphuric acid and then 0.5 part by weight of potassium persulphate and 1.0 part by weight of sodium pyrosulphite are added thereto. The mixture is then heated to 50° C. After a few minutes, a white polymer starts to separate out. The reaction is stopped after 3 hours. The polymer is extracted on a suction filter, thoroughly washed and then dried at 50° C. There are obtained 18.0 parts by weight of a pure white finely divided powder.

The methacroylaminobenzene-benzene disulphonimide is obtained by reacting equivalent quantities of the amino-benzene-disulphonimide with methacrylic chloride in aqueous solution in the presence of soda. On completion of the reaction and after acidifying with hydrochloric acid, a white crystalline powder is obtained which is no longer capable of being diazotized and which consists of a mixture of 24.6% of common salt and 75.4% of methacroylaminobenzene-benzene disulphonimide.

Analysis shows: Calculated: Na, 9.6%; Cl, 15%; N, 5.55%; S, 12.6%; O, 15.8%. Found: Na, 10.1%; Cl, 15%; N, 6.08%; S, 12.8%; O, 15.87%.

Example 2

The procedure followed is as described in Example 1 and 280 parts by volume of water, 18.5 parts by weight of acrylonitrile, 1.0 part by weight of acrylic acid methyl ester and 0.5 part by weight of methacrylaminobenzene-benzene disulphonimide are placed in a vessel which has previously been flushed with nitrogen. The pH value of the solution is adjusted to 3 with phosphoric acid and 1.0 part by weight of potassium persulphate and 2.0 parts by weight of sodium pyrosulphite are added thereto. The polymerization is allowed to proceed for 18 hours at 30° C., the precipitated polymer is extracted on a suction filter, washed and then dried at 60° C. The yield is 19.0 parts by weight of polymer.

The polymers obtained as described in Examples 1 and 2 were dissolved in dimethyl formamide and cast to form films. For testing their thermostability, the films are heated in air for 3 hours at 160° C. Only a slight discolouration is observed. Comparison samples of analogous polymers without addition of disulphonimide show a much stronger discolouration. The dyeing capacity is judged with the aid of basic dyestuffs (for example with a dyestuff according to Example 1 or 2 or French patent specification 1,158,839). Both samples can be dyed very satisfactorily. In contrast thereto, films made of co-polymers which are obtained by the process described in Examples 1 and 2 but without any addition of unsaturated disulphonimides are scarcely dyed at all.

Example 3

0.54 part by weight of potassium persulphate is added to a solution of 20.0 parts by weight of methacrylaminobenzene-benzene disulphonimide in 280 parts by weight of distilled and boiled water. The reaction vessel is then thoroughly flushed with nitrogen and heated for 18 hours at 50° C. A viscous solution is obtained which is dialysed through cellophane to eliminate inorganic salts. After evaporation of the water, there remain 15.0 parts by weight of a transparent and very brittle product which is readily soluble in water. The molecular weight of the product as determined by osmotic pressure measurements is about 15,000.

*Example 4*

2.0 parts by weight of a potassium-paraffin sulphonate ($C_{12}$–$C_{18}$) and 6.0 parts by weight of vinyl benzene-benzene disulphonimide are dissolved in 560 parts by weight of ditsilled water. 32.0 parts by weight of isoprene and 1.0 part by weight of bis-azoisobutyric acid nitrile are added thereto and the mixture is heated for 26 hours at 64° C. The latex which forms is coagulated with a mixture of common salt solution and ethanol. After drying the coagulate, 13.5 parts by weight of a white pulverous product are obtained. The co-polymer contains 2.94% of nitrogen and 0.7% of sulphur.

The vinyl benzene-benzene disulphonimide is obtained by reacting styrene sulphonamide with benzene-sulphonic acid chloride in alkaline solution at 10–15°. After acidifying the reaction medium with hydrochloric acid, a white paste is formed which in contrast to styrene sulphonimide, is readily soluble in water and which is used as such for polymerization purposes.

*Example 5*

In 500.0 parts by weight of water, there are dissolved 5.0 parts by weight of a water-soluble potassium salt of a paraffin sulphonic acid ($C_{12}$–$C_{18}$) and 11.0 parts by weight of an unsaturated disulphonimide, which is obtained by reacting [β-isocyanatoethyl]-methacrylate with p-aminobenzene-benzene-disulphonimide and which conforms to the following formula

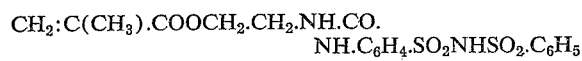

After adding 40.0 parts by weight of vinyl chloride and 1.5 parts by weight of bis-azoisobutyric acid nitrile, the mixture is heated for 20 hours at 50° C. After coagulation with common salt solution and after drying, there are obtained 18.5 parts by weight of a white powder which has a chlorine content of 21.2%.

*Example 6*

0.2 part by weight of sodium hydroxide, 0.3 part by weight of sodium pyrophosphate and 12.5 parts by weight of methacroylaminobenzene-benzene disulphonimide are dissolved in 280.0 parts by weight of distilled water. 80.0 parts by weight of acrylic acid methyl ester and 1.08 parts by weight of potassium persulphate are then added. The polymerization vessel is then flushed with nitrogen and heated for 17 hours at 45° C. The resulting dispersion, which is in very finely divided form, is filtered off with suction and the residue is dried. There are thus obtained 65.0 parts by weight of a viscous rubber-like product which has a K-value (according to Fikentscher, Cellulosechemie 13, 58 (1932) of 120. 6. The co-polymer contains 1.29% of nitrogen and 2.3% of sulphur.

*Example 7*

70.0 parts by weight of styrene are suspended in a solution of 30.0 parts by weight of methacroylaminobenzene-methyl disulphonimide and 1.90 parts by weight of sodium pyrosulphite. After displacing the air by means of nitrogen, 1.08 parts by weight of potassium persulphate are added and the reaction mixture is heated for 42 hours at 30° C. The finely divided dispersion is filtered off with suction, the residue is washed with water and dried. There are thus obtained 93.0 parts by weight of a white, friable, brittle product having a K-value of 115.0. The co-polymer contains 1.20% of nitrogen and 2.3% of sulphur.

The 3 - methacroylaminobenzene - (N - methane-sulphonyl)-amide used for co-polymerization purposes is obtained by the same process as the methacroylaminobenzene-benzene disulphonimide used in Example 1. The product which is formed is a white crystalline powder which consists of 71.9% of the desired compound and 28.1% of common salt. From the analysis figures, a C:H:O:S:N: ratio of 10.8:13.8:5.14:1.955:2 is found. Calculated is a C:H:O:S:N: ratio of 11:14:5:2:2.

*Example 8*

15.0 parts by weight of methacroylaminobenzene-benzene disulphonimide, 30.0 parts by weight of polystyrene sulphonic acid and 42.0 parts by weight of sodium pyrosulphite are distilled in 14,000 parts by weight of distilled water in a porcelain vessel and the solution is adjusted to a pH value of 2–3 with phosphoric acid. 920 parts by weight of acrylonitrile and 65.0 parts by weight of acrylic acid methyl ester are then added. After displacing the air from the polymerization vessel by flushing with nitrogen, the reaction mixture is heated to 50° C. and then 21.0 parts by weight of potassium persulphate are added. The mixture is cooled after 4 hours. The reaction product is filtered off with suction and the polymer is washed thoroughly several times with water. After drying at 50° C., there are obtained 910.0 parts by weight of a pure white polymer having a K-value of 94.0.

*Example 9*

In a porcelain vessel, there are placed 2600 parts by weight of distilled water, 12.0 parts by weight of a polymeric disulphonimide (prepared by reacting 4,4'-diaminobenzene disulphonimide with phosgene), 8.0 parts by weight of methylacroyl-m-aminobenzene-benzene disulphonimide, 368.0 parts by weight of acrylonitrile, 26.0 parts by weight of acrylic acid methyl ester and 6.32 parts by weight of sodium pyrosulphite. After displacing the air by means of nitrogen, the mixture is heated to 40° C. and 3.26 parts by weight of potassium persulphate and 0.008 parts by weight of $CuSO_4.5H_2O$ are added. After polymerization has commenced, there are additionally run in over a period of 4 hours a solution of 48.0 parts by weight of polydisulphonimide, 32.0 parts by weight of methylacroyl-m-aminobenzene-benzene-disulphonimide, 25.28 parts by weight of sodium pyrosulphite, 13.0 parts by weight of potassium persulphate and 0.016 part by weight of $CuSO_4.5H_2O$ in a total of 10,400 parts by weight of distilled water, as well as a mixture of 1472 parts by weight of acrylonitrile and 104 parts by weight of acrylic acid methyl ester. The mixture was stirred for another hour and then worked up as described in the previous example. 1834.0 parts by weight of polymer with a K-value of 98.0 are obtained.

The co-polymers obtained as described in Examples 8 and 9 were dissolved in dimethyl formamide and cast to form films. For testing their thermostability, the films were heated in a stream of air for 3 hours at 160° C. The extremely slight discolouration of the films thereby produced is considerably less than that of comparison products which were prepared by polymerization under identical conditions, but in the absence of polystyrene sulphonic acid and polydisulphonimide, respectively.

*Example 10*

In a porcelain vessel there are placed 4600 parts by weight of acrylonitrile, 325 parts by weight of acrylic acid methyl ester, 75 parts by weight of methacroylaminobenzene-benzene disulphonimide, 190 parts by weight of sodium pyrosulphite and 46,000 parts by weight of distilled and boiled water. After adjusting the solution to a pH-value of 2 to 3, the reaction vessel is thoroughly flushed with nitrogen, the reaction mixture heated to 45° C. and 150.5 parts by weight of potassium persulphate are added. Polymerization is complete after about 5 hours. The finely divided suspension is filtered off with suction, thoroughly washed several times with salt-free water and dried in vacuum at 50° C. 4580 parts by weight of a purely white polymer having a K-value of 94.5 are obtained (polymer A).

For comparison a second polymer is produced by the aforesaid process using however instead of disulphonimide, an equal quantity of acrylic acid methyl ester in addition to the quantity of acrylic acid methyl ester used in the first process. The K-value of the polymer obtained in the second process is 93.2 (polymer B).

The polymers A and B are spun under identical conditions in known manner by a wet spinning process using dimethyl acetamide as solvent. The resulting filaments are stretched in boiling water to 7 times their initial length, dried while the length of the filaments is kept constant and subsequently relaxed by the action of superheated steam. After this treatment the filaments have a denier of 3.12 per monofil and a tensile strength of 2.95 g./den. and an elongation at break of 29%.

The filaments are dyed at 100° C. with 3% of an alkylamino anthraquinone dyestuff with the addition of acetic acid and sodium acetate at a liquor-to-goods ratio of 1:50. A process of producing the alkylamino anthraquinone dyestuff used is described in Example 3 of French Patent 1,158,839. The filaments made from polymer A are deep dark blue coloured, while the filaments made from polymer B have a medium blue shade. The quantity of dyestuff absorbed by the filaments is colorimetrically compared as follows: part of the dyed filaments is dissolved in slightly acidified dimethylformamide to give 0.1% solutions. The solutions are introduced into 2 cm. long vessels and the extinctions of the solutions are measured in comparison with the extinction of the pure solvent, using a yellow filter S 57 E (maximum absorption at about 572 m$\mu$) and an electro-photometer Elko III (made by Zeiss). The extinction values are approximately proportional to the dyestuff content:

|  | Extinction |
|---|---|
| Solution of dyed filaments made from polymer A | 0.676 |
| Solution of dyed filaments made from polymer B | 0.270 |

The absorption spectra of the solutions show that the colour shades of both dyeings are identical. In this respect the polymers containing disulphonimide groups are distinguished from polymers containing other strongly acid groups, in particular sulpho groups, which frequently show an undesired change in the colour shade on the dyed material.

*Example 11*

In an enamelled autoclave from which the air has been displaced by flushing several times with nitrogen, there are polymerized 33,250 parts by weight of acrylonitrile, 1575 parts by weight of acrylic acid methyl ester and 175 parts by weight of methacroylaminobenzene-benzene disulphonimide in 322,000 parts by weight of salt-free water in the presence of 757 parts by weight of sodium pyrosulphite, 603.5 parts by weight of potassium persulphate and 35 parts by weight of sodium acetate. At the beginning about 20% of the aforesaid components are placed in the autoclave. The reaction mixture is then heated to a temperature of about 43° C. After the polymerization has set in the residual quantities of the components are added in such a manner that the reaction temperature is prevented from exceeding 45° C. The pH-value is kept between 2 and 3 during polymerization by adding sulphuric acid. Polymerization is complete after about 7 hours. The polymer obtained is filtered off, thoroughly washed several times with salt-free water and dried at 50° C. in a cabinet wherein drying is effected with circulating air. 32,500 parts by weight of polymer having a K-value of 86.3 are obtained (polymer C).

Another polymer is prepared under identical conditions, however without the disulphonimide compound, but using instead a further 175 parts by weight of acrylic acid methyl ester in addition to the above said quantity of acrylic acid methyl ester. The K-value of the polymer thus obtained is 85.7 (polymer D).

26.5% solutions of the polymers C and D are prepared in dimethyl formamide and spun into filaments by the dry-spinning process. These filaments are stretched in boiling water by 450% and dried without tension. After this treatment the filaments have a denier of 2.05, a tensile strength of 3.15 g./den. and an elongation at break of 34.5%.

The filaments are dyed as described in Example 10, however, by using 1.6% of the alkylamino anthraquinone dyestuff obtainable as described in Example 4 of French Patent 1,158,839. The filaments made from polymer C show a deep red dyeing, while the filaments of polymer D show a pink dyeing. The depth of colour of the dyeings is measured as described in Example 10, however a green filter S 53 E (maximum absorption at about 529 m$\mu$) is employed.

|  | Extinction |
|---|---|
| Solution of dyed filaments made from polymer C | 0.857 |
| Solution of dyed filaments made from polymer D | 0.252 |

When dyeing the filaments under identical conditions in separate baths and colorimetrically measuring the exhaustion of the dyebaths the dyeing velocity determined in respect of filaments made from polymer C is about 75% higher than that in respect of filaments made from polymer D.

When dyeing the filaments until saturation, the dye absorption value is 1.55 in respect of filaments made from polymer C, and 1.00 in respect of filaments made from polymer D.

The absorption spectra of solutions of the dyed filaments show identical colour shades of the dyeings.

We claim:

1. A process for the preparation of polymers containing disulphonimide groups, which comprises polymerizing unsaturated disulphonimides of the following formula:

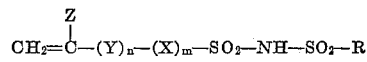

wherein
R represents a radical selected from the group consisting of methyl and phenyl,
X represents an arylene radical,
Y represents a divalent bridge containing a group selected from the group consisting of

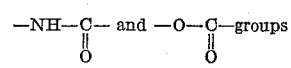

Z represents a member selected from the group consisting of hydrogen and methyl,
$n$ represents a numeral varying from 0 to 1, and
$m$ represents a numeral varying from 0 to 1 in the presence of a free-radical forming polymerization catalyst.

2. A process for the preparation of copolymers containing disulphonimide groups which comprises copolymerizing unsaturated disulphonimides of the following formula:

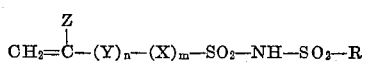

wherein
R represents a radical selected from the group consisting of methyl and phenyl,
X represents an arylene radical, Y represents a divalent bridge containing a group selected from the group consisting of

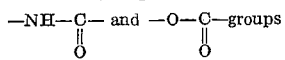

Z represents a member selected from the group consisting of hydrogen and methyl,
n represents a numeral varying from 0 to 1, and
m represents a numeral varying from 0 to 1 with at least one ethylenically unsaturated compound polymerizable therewith in the presence of a free-radical forming polymerization catalyst.

3. Process according to claim 2 wherein the ethylenically unsaturated polymerizable compound is selected from the group consisting of acrylonitrile, methacrylonitrile, acrylic esters, methacrylic esters, acrylic acids, methacrylic acids, acrylic amides, methacrylic amides, styrene, divinyl benzene, vinyl chloride, vinyl esters, vinyl sulphonic acids, derivatives of vinyl sulphonic acids, butadiene, isoprene, chloroprene, crotonic acid, derivatives of crotonic acid, 1,1-dichloroethane, maleic acid, fumaric acid and derivatives of fumaric and maleic acid.

4. A process for the preparation of copolymers containing disulphonimide groups, which comprises copolymerizing 0.1–5.0 parts by weight of an unsaturated disulphonimide of the following formula:

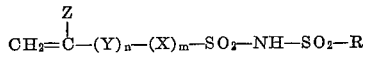

wherein
R represents a radical selected from the group consisting of methyl and phenyl,
X represents an arylene radical,
Y represents a divalent bridge containing a group selected from the group consisting of

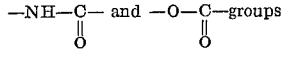

Z represents a member selected from the group consisting of hydrogen and methyl,
n represents a numeral varying from 0 to 1, and
m represents a numeral varying from 0 to 1, with 2.5–10.0 parts by weight of an acrylic acid ester and 97.4–85.0 parts by weight of acrylonitrile in the presence of a free-radical forming polymerization catalyst.

5. A process for the preparation of copolymers containing disulphonimide groups, which comprises copolymerizing 0.1–5.0 parts by weight of an unsaturated disulphonimide of the following formula:

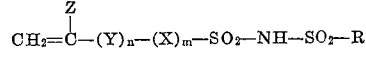

wherein
R represents a radical selected from the group consisting of methyl and phenyl,
X represents an arylene radical,
Y represents a divalent bridge containing a group selected from the group consisting of

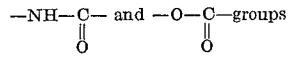

Z represents a member selected from the group consisting of hydrogen and methyl,
n represents a numeral varying from 0 to 1, and
m represents a numeral varying from 0 to 1, with 2.5–10.0 parts by weight of vinylacetate and 97.4–85.0 parts by weight of acrylonitrile in the presence of a free-radical forming polymerization catalyst.

6. A process for the preparation of copolymers containing disulphonimide groups, which comprises copolymerizing 0.1–5.0 parts by weight of an unsaturated disulphonimide of the following formula:

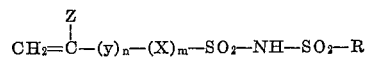

wherein
R represents a radical selected from the group consisting of methyl and phenyl,
X represents an arylene radical,
Y represents a divalent bridge containing a group selected from the group consisting of

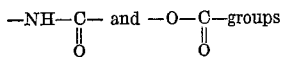

Z represents a member selected from the group consisting of hydrogen and methyl,
n represents a numeral varying from 0 to 1, and
m represents a numeral varying from 0 to 1, with 2.5–10.0 parts by weight of vinylchloride and 97.4–85.0 parts by weight of acrylonitrile in the presence of a free-radical forming polymerization catalyst.

7. A polymer of unsaturated disulphonimides of the following formula:

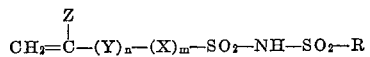

wherein
R represents a radical selected from the group consisting of methyl and phenyl,
X represents an arylene radical,
Y represents a divalent bridge containing a group selected from the group consisting of

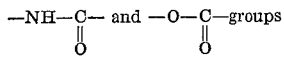

Z represents a member selected from the group consisting of hydrogen and methyl,
n represents a numeral varying from 0 to 1.
m represents a numeral varying from 0 to 1.

8. A copolymer of unsaturated disulphonimides of the following formula:

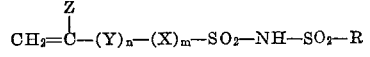

wherein
R represents a radical selected from the group consisting of methyl and phenyl,
X represents an arylene radical,
Y represents a divalent bridge containing a group selected from the group consisting of

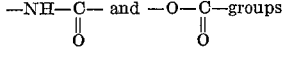

Z represents a member selected from the group consisting of hydrogen and methyl,
n represents a numeral varying from 0 to 1, and
m represents a numeral varying from 0 to 1, and at least one ethylenically unsaturated compound polymerizable therewith.

9. A copolymer according to claim 32 wherein the ethylenically unsaturated polymerizable compounds are selected from the group consisting of acrylonitrile, methacrylonitrile, acrylic esters, methacrylic esters, acrylic acids, methacrylic acids, acrylic amides, methacrylic amides, styrene, divinyl benzene, vinyl chloride, vinyl esters, vinyl sulphonic acids, derivatives of vinyl sulphonic acids, butadiene, isoprene, chloroprene, crotonic acid, derivatives of crotonic acid, 1,1-dichloroethane, maleic acid, fumaric acid and derivatives of fumaric and maleic acid.

10. A copolymer of 0.1–5.0 parts by weight of unsaturated disulphonimides of the following formula:

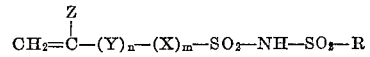

wherein
R represents a radical selected from the group consisting of methyl and phenyl,
X represents an arylene radical, Y represents a divalent bridge containing a group selected from the group consisting of

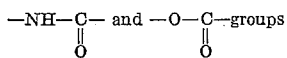

Z represents a member selected from the group consisting of hydrogen and methyl,
n represents a numeral varying from 0 to 1, and
m represents a numeral varying from 0 to 1, with 2.5–10.0 parts by weight of an acrylic acid ester and 97.4–85.0 parts by weight of acrylonitrile.

11. A copolymer of 0.1–5.0 parts by weight of unsaturated disulphonimides of the following formula:

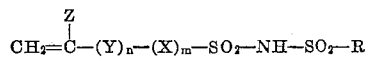

wherein
R represents a radical selected from the group consisting of methyl and phenyl,
X represents an arylene radical,
Y represents a divalent bridge containing a group selected from the group consisting of

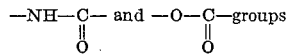

Z represents a member selected from the group consisting of hydrogen and methyl,
n represents a numeral varying from 0 to 1, and
m represents a numeral varying from 0 to 1, with 2.5–10.0 parts by weight of vinylacetate and 97.4–85.0 parts by weight of acrylonitrile.

12. A copolymer of 0.1–5.0 parts by weight of unsaturated disulphonimides of the following formula:

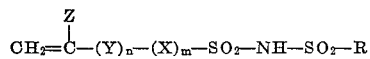

wherein
R represents a radical selected from the group consisting of methyl and phenyl,
X represents an arylene radical,
Y represents a divalent bridge containing a group selected from the group consisting of

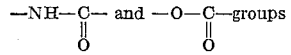

Z represents a member selected from the group consisting of hydrogen and methyl,
n represents a numeral varying from 0 to 1, and
m represents a numeral varying from 0 to 1, with 2.5–10.0 parts by weight of vinylchloride and 97.4–85.0 parts by weight of acrylonitrile.

No references cited